Jan. 25, 1927.
H. W. PIERCE
1,615,724
RIVETING MACHINE
Filed Feb. 3, 1926
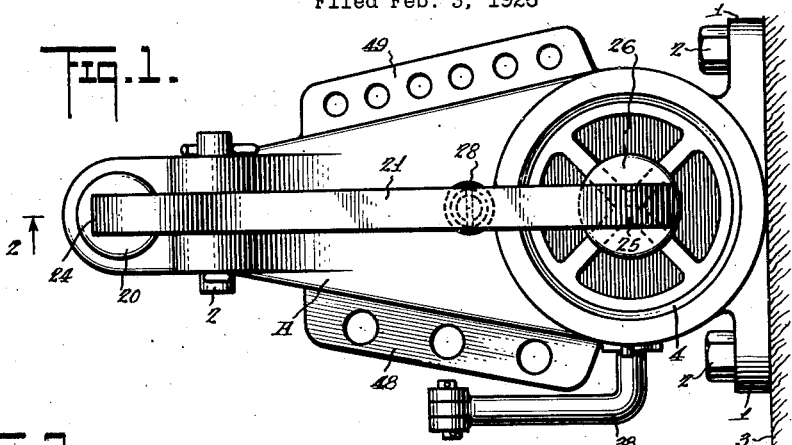
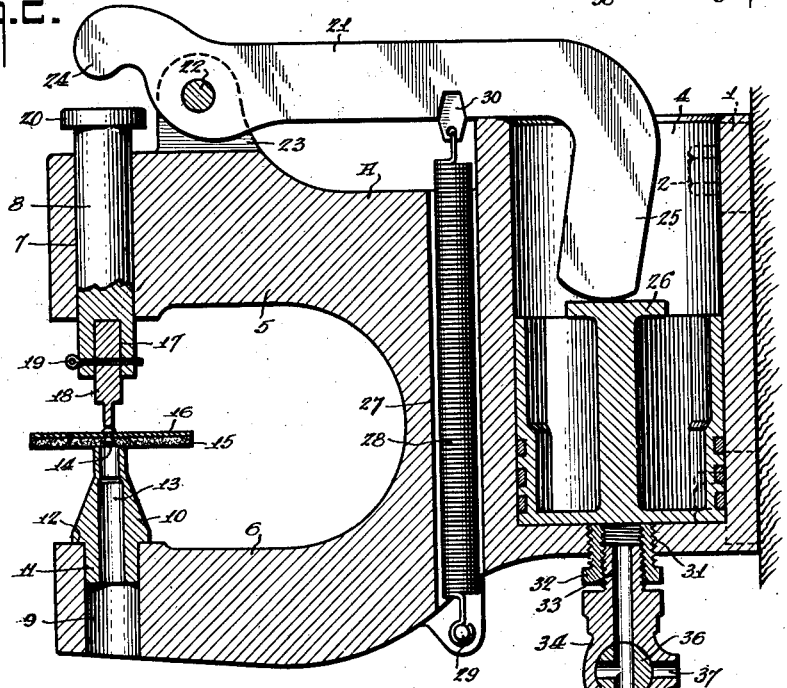
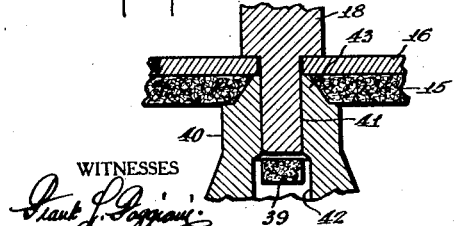
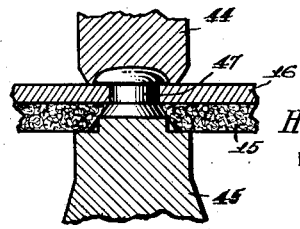
WITNESSES
INVENTOR
Howard William Pierce
BY
ATTORNEYS Patented Jan. 25, 1927.

1,615,724

UNITED STATES PATENT OFFICE.

HOWARD W. PIERCE, OF BUTTE, MONTANA.

RIVETING MACHINE.

Application filed February 3, 1926. Serial No. 85,737.

The invention relates to riveting machines.

An object of the invention is to provide a small, compact, strong and durable machine which is especially adapted for use in connection with brakes and brake linings although of course the invention is not limited to this particular use.

A further object is to provide a machine of this character which will punch out rivets holding old lining to brake bands, which will countersink the linings of new brake bands, at the same time perforating the lining, and which will also function to securely rivet a new lining to a brake band.

A further object is to provide a machine of this character which will occupy but small space, which is operated by air or other fluid under control of the operator, and which may be secured to a wall or other support in convenient position for use.

A further object is to provide a machine which does the job in less time, with less physical effort and a better job than the present brake lining machines. One reason is that it is operated by an air cylinder which can be connected to any ordinary air system. The tendency to miss the rivet due to the exertion of setting rivet with foot and at the same time trying to balance yourself on one foot is entirely eliminated. The rivet is in place and the punch located on top of it when the power is applied, making it absolutely certain that the rivet is not shifted at the instant the attempt is made to set it, as the operator is simply opening the valve, not furnishing power to set the rivet. There is no fatigue in operating this machine. In punching holes there is power enough to efficiently countersink the brake linings by crowding the material away from the hole without in any way damaging or cutting it, which leaves the total strength of the brake lining still intact.

A further object is to provide a riveting machine in which the plunger may be manually set relative to the brake before pressure is applied to the plunger.

With these and other objects in view, the invention consists in certain novel features of construction and combinations and arrangements of parts, which will be more fully hereinafter described and pointed out in the claims.

In the accompanying drawings—

Figure 1 is a top plan view of my improved machine;

Figure 2 is a view in vertical longitudinal section on the line 2—2 of Figure 1;

Figure 3 is an enlarged fragmentary sectional detail view, showing my improved plunger operating to perforate a brake band and countersink the same.

Figure 4 is a view similar to Figure 3, showing my improved machine performing the riveting operation.

A represents a casting which is provided with perforated flanges, one at one end for the reception of bolts 2 or other devices to secure the same to a wall 3 or other support.

The casting A adjacent the supporting end is shaped to form a cylinder 4, the latter open at its upper end and closed at its lower end.

A pair of forwardly projecting integral arms 5 and 6, constituting a part of the casting A, is integral with the cylinder A so as to form a compact, strong and durable structure. The upper arm is provided with a vertical bore 7 in which a plunger 8 is movable. The lower arm 6 is made with a bore 9 in line with bore 7 and adapted to receive various forms of anvil, one of which is indicated by reference numeral 10.

This anvil 10 has a nipple 11 at its lower end fitting in the bore 9 and is made with an annular shoulder 12, engaging the upper face of the arm 6, as clearly shown. The anvil 10 has a longitudinal bore 13 through which a part 14 may be projected. This part 14 is shown connecting a brake lining 15 with a brake band 16, reference being made to Figure 2 of the drawings.

The plunger 8 above referred to is recessed in its lower end, as shown at 17, to receive a punching tool 18 secured therein preferably by a cotter pin 19, although of course the particular securing means may be modified to suit the trade. An enlarged head 20 is formed on the upper end of plunger 8, larger than the bore 7, so as to prevent the plunger from falling out of the bore and also to prevent the piston 26 from blowing out of the cylinder.

My improved power mechanism operating the plunger includes a lever 21 which is pivotally supported near its forward end on a pin 22, located in perforated ears 23 on top of arm 5. The lever 21 has a rounded free end 24 in position to engage the head 20 of plunger 8 but is normally spaced from said plunger, as shown in Figure 2. The other or longer end of the lever 21 is made with a downwardly projecting arm 25 which is engaged by a piston 26 in cylinder 4.

The casting A is made with an opening 27 extending vertically through the same adjacent the cylinder 4 and accommodates a coil spring 28. The lower end of this coil spring is connected to a lug 29 on arm 6, and the upper end of said spring is removably connected to a perforated lug 30 on the lever 21 and exerts a downward pull on the long end of the lever 21 to maintain the arm 25 always in engagement with the upper end of the piston 26.

The lower end of the cylinder 4 is made with a screw-threaded opening 31 receiving a bushing 32 in which a threaded nipple 33 on a valve casing 34 is screwed. This valve casing may be connected by a pipe 35 with any source of air or other fluid supply. In the casing 34 a three-way rotary valve 36 is provided which is adapted to connect the wall pipe 35 with the cylinder or connect the cylinder with an outlet 37 communicating with the atmosphere.

I have shown a crank arm 38 connected to the valve 36 to operate the same, and this arm may be operated by a treadle or manually in any way desired.

In Figure 3 I illustrate my improved machine in the operation of perforating a brake lining and countersinking the same. In this operation the punching tool 18 is shown forcing a section 39 of the lining 15 from the lining to perforate the same. This view also illustrates a form of anvil 40 which is made with a bore 41 to receive the operating end of the punch 18 and with a larger bore 42 through which the punched material will fall. The upper end of the anvil 40 is of truncated conical form, as shown at 43, so that when the lining is forced thereon this end 43 will countersink the opening made in the lining.

Figure 4 illustrates my improved machine in the act of riveting. In this view a riveting tool 44 is connected with the plunger 8 and a solid anvil 45 is mounted on the arm 6. A rivet 47 is positioned in the opening made by the device illustrated in Figure 3, and then the plunger is located on the rivet. Air is then turned on to move the piston 26 and the arm 21 to force the plunger 8 downwardly and complete the riveting operation.

I would call particular attention to the fact that the plunger 8 is spaced from the free end 24 of arm 21 which allows this plunger to be manually moved in a vertical direction so as to position the work on the anvil and to then allow the plunger to move by gravity down upon the rivet or in position for punching so that the work will be properly set before any pressure is applied to the lever to complete the work.

The spring 28 functions to lift the free end of lever 21 and maintain the other end of the lever always in contact with the plunger 26. The spring therefore also assists the downward movement of the piston to force air out of the cylinder when the valve 36 is turned to permit this exhaust.

My improved machine is small and compact as compared with other riveting machines of which I have any knowledge and is especially adapted for use in connection with the changing of brake linings, thus giving to the garage or service station a machine which can be bought for a reasonably low price, which will greatly facilitate the work which heretofore been done, and which will insure a better job than has been possible with tools such as heretofore used for the purpose.

On the sides of the casting I preferably form perforated webs 48 and 49 which accommodate various anvils, punches, riveting tools, or any other tools which might be desired for use.

It will be noted that the pin 22 as well as the connection of the spring 28 with lug 30 is made removable so that the lever can be detached and connected as occasion may require.

My improved machine eliminates all rods, piston or connecting rods, and all linkage.

Various slight changes and alterations might be made in the general form of the parts described without departing from the invention and hence I do not limit myself to the precise details set forth but consider myself at liberty to make such slight changes and alterations as fairly fall within the spirit and scope of the appended claims.

I claim:

1. A machine of the character described comprising a casting having an integral cylinder formed therein and a pair of arms integral with the cylinder and located one above the other, a fluid operated piston in the cylinder, an anvil supported by one of the arms, a movable plunger supported by the other of said arms, a lever pivotally connected to the casting operated by the piston and adapted to force the plunger toward the anvil, and a spring engaging the arm holding the same against the piston and normally spaced from the plunger whereby the plunger is capable of manual manipulation before engagement by the arm.

2. A machine of the character described, comprising a casting having an integral cylinder formed therein and a pair of arms integral with the cylinder and located one above the other, a fluid operated piston in the cylinder, an anvil supported by one of the arms, a movable plunger supported by the other of said arms, a lever pivotally connected to the casting operated by the piston and adapted to force the plunger toward the anvil, said casting having an opening therein, and a coil spring in the opening secured at the lower end of the casting and at its upper end to the lever, and exerting a pull on the lever, holding the same normally spaced from the plunger.

3. A machine of the character described, including a support, an anvil removably connected to the support, said anvil having a longitudinal bore therethrough and having a tapering upper end adapted to countersink the material, a plunger above the anvil, and a tool carried by the plunger adapted to move into the bore of the anvil in punching the material on the anvil whereby the punching and countersinking operation is simultaneous.

HOWARD W. PIERCE.